(12) United States Patent
Vasquez et al.

(10) Patent No.: US 12,107,643 B2
(45) Date of Patent: Oct. 1, 2024

(54) REPORTING DEVICE FOR MULTIMODAL ARTICLE INTERFACE

(71) Applicant: ENERGYSQUARE, Saint-Mandé (FR)

(72) Inventors: Pablo Vasquez, Saint-Mandé (FR); Valentin Tovey, Saint-Mandé (FR); Damien Vielpeau, Saint-Mandé (FR); Daniel Lollo, Paris (FR)

(73) Assignee: ENERGYSQUARE, Saint-Mandé (FR)

( * ) Notice: Subject to any disclaimer, the term of this patent is extended or adjusted under 35 U.S.C. 154(b) by 545 days.

(21) Appl. No.: 17/421,036

(22) PCT Filed: Dec. 10, 2019

(86) PCT No.: PCT/EP2019/084444
§ 371 (c)(1),
(2) Date: Jul. 7, 2021

(87) PCT Pub. No.: WO2020/143976
PCT Pub. Date: Jul. 16, 2020

(65) Prior Publication Data
US 2022/0077890 A1    Mar. 10, 2022

(30) Foreign Application Priority Data
Jan. 8, 2019   (EP) ................................. 19305023

(51) Int. Cl.
*H04B 3/54*    (2006.01)
(52) U.S. Cl.
CPC .............. *H04B 3/546* (2013.01); *H04B 3/544* (2013.01); *H04B 3/548* (2013.01)
(58) Field of Classification Search
CPC ........ H04B 3/546; H04B 3/544; H04B 3/548; H04B 3/56; H02J 1/082; H02J 1/08
See application file for complete search history.

(56) References Cited

U.S. PATENT DOCUMENTS 5,297,097 A * 3/1994 Etoh ..................... G11C 11/406
                                                          327/530
2010/0022285 A1    1/2010 Randall et al.
(Continued)

FOREIGN PATENT DOCUMENTS

CN    103168504 A  *  6/2013  ............. H05B 45/44
CN    104657314 A     5/2015
(Continued)

OTHER PUBLICATIONS

English Translation of Notification of the First Office Action issued in Chinese Patent Application No. 201980091456.4 dated Sep. 20, 2023.

*Primary Examiner* — Tung S Lau
(74) *Attorney, Agent, or Firm* — BakerHostetler

(57) ABSTRACT

A reporting device for association with an article having power requirements is provided, where the reporting device is capable of performing communications operations, for example to specify the article's power requirements, and power supply using a single pair of conductors. Communications are performed at a lower voltage than the voltage intended for power supply operations. Optionally the communications interface of the reporting device may be disconnected at higher voltages, and the operational circuits of the reporting device may be disconnected at lower voltages, and circuits preventing inversion of voltages across the conductors, or reverse currents when the operational circuits are connected to the conductors may be provided. The reporting device may be used in connection with charging surfaces providing a matrix of conductive surfaces, and supports operation with a corresponding coupling manager.

12 Claims, 8 Drawing Sheets

(56) References Cited

U.S. PATENT DOCUMENTS

| | | |
|---|---|---|
| 2013/0043835 A1 | 2/2013 | Yoon |
| 2013/0265683 A1 | 10/2013 | Gueltig |
| 2014/0312709 A1 | 10/2014 | Nakano et al. |
| 2017/0033836 A1* | 2/2017 | Bernauer ................ A24F 40/40 |
| 2018/0262028 A1 | 9/2018 | Lollo et al. |

FOREIGN PATENT DOCUMENTS

| | | |
|---|---|---|
| CN | 106059872 A | 10/2016 |
| CN | 108539808 A | 9/2018 |
| WO | 2005/060401 A1 | 7/2005 |
| WO | 2013/069472 A2 | 5/2013 |
| WO | 2017/046458 A1 | 3/2017 |

\* cited by examiner

REPORTING DEVICE FOR MULTIMODAL ARTICLE INTERFACE

CROSS-REFERENCE TO RELATED APPLICATIONS

This application is a National Stage of International patent application PCT/EP2019/084444, filed on Dec. 10, 2019, which claims priority to foreign European patent application No. EP 19305023.4, filed on Jan. 8, 2019, the disclosures of which are incorporated by reference in their entirety.

FIELD OF THE INVENTION

The present invention relates generally to articles that may use electrical conductors for both communications and power supply.

BACKGROUND OF THE INVENTION

Over recent years portable electronic devices have become increasingly ubiquitous-telephones, media players, tablet and laptop computers, IoT (Internet of Things) devices or the like and portable loudspeaker units are now widespread. With a tendency towards miniaturisation on one hand, and the increasing size and brightness of displays and expectancy of wireless connectivity on the other, demands on the energy storage capacity of the batteries of these devices are more and more challenging. In view of these considerations, users are increasingly subject to "low battery anxiety", where the level of charge of their various devices, and the time until the next opportunity to recharge them, is a continuous source of concern. An attempt to address this problem using stand-alone general purpose rechargeable battery units adds to the list of devices to be recharged and carried. This issue is further complicated by the range of power connectors and varying voltage requirements of these devices, which can make it necessary for individuals to carry a range of chargers and cables with them, nullifying many of the advantages of the devices miniaturisation.

WO2017046458 presents a partial solution to this problem.

FIG. 1 presents aspects of the prior art approach provided by WO2017046458.

As shown, a nomadic electronic device 120 is positioned to be recharged on a planar mating surface 110 provided with a plurality of contact zones 111, 112, 113, 114, by using an adapter 1301.

FIG. 2 presents aspects of the prior art approach provided by WO2017046458 in further detail. As shown, the nomadic electronic device 120 is positioned to be recharged on a planar recharging surface 110 provided with a plurality of contact zones 111, 112, 113, 114, by using an adapter, which is represented in FIG. 2 as the footprint 230 of the adapter 130 on the surface 110. As shown in FIG. 2, the adapter 130 defines two electrically conducting terminals 231, 232 of small cross section in an external face of the adapter strip.

For each device to be energized, there is provision to abut an internal face of the strip against a face of the device and to engage a connector into the device on the side of a bent part of the strip to place the adapter between the device and the recharging surface so as to allow conduction from two of the contact zones, the terminals 231, 232 being spaced a predetermined distance apart which is much greater than their cross-sectional size. As described in WO2017046458, contact 1o zones are selectively energized with current, so that the zones 112, 114 on which the two terminals 231, 232 are positioned respectively come into a functional state and allow recharging of the device 120 via the adapter 230.

As described in WO2017046458, in order to determine the status of each contact zone with a view to determining the presence of a device to be charged, there is provided a processing unit which is able to briefly drive independently each of the conductive zones from a low potential (e.g. 0V) to a high potential (e.g. 5V). The processing unit also manages a data link to drive ADCs for measuring the current drawn by each conductive zone. If the current drawn corresponds to an expected current value for a chargeable device, the high voltage is maintained on the corresponding conductive zone. Otherwise, the element 80 is returned to the low voltage.

Accordingly, nomadic devices equipped with the proposed adapter can be placed freely on such a planar surface equipped with the described system, and hopefully be detected and provided with a power supply voltage accordingly.

A drawback of this approach lies in the fact that in a case where an electrical connection exists between any two conductive regions for some reason besides the presence of a chargeable device, for example due to a conductive article such as a metal tool or ornament being placed on the surface, the testing process will create a short circuit to ground through this connection, leading to a flow of current. Depending on the conductive properties of the article, this may appear to the controller as characteristic of a chargeable device, which may lead to an attempt to supply power to the article, leading to a waste of energy and possible damage to the article, the conductive zones or the controller.

US2010/022285 presents a related solution for retrofitting a mobile electronic device, which has an input power receptacle located on its side, to receive power from a power delivery pad that has a flat power delivery surface. A connector assembly is connectable to the mobile electronic device by plugging a connector into the input power receptacle of the device. A power receiver assembly connects pivotally and electrically to the connector assembly by magnetism. The power receiver assembly is pivotal to position a power receiver hub, which is at a fixed distance from the connector assembly, over an axis of the mobile device, where an anchor comprising magnetic material or a mechanical attachment apparatus is adhered to the surface of the mobile device, and the hub is attached to the anchor by magnetism also, so that it is simply and easily detachable and re-attachable. The connector is adjustable in the connector assembly to position the power receiver assembly flush with the surface of the mobile device. Alternate connector assemblies with differently configured connectors are attachable magnetically or mechanically to the power receiver assembly.

WO2005/060401 meanwhile describes a power transfer pad, having a non-conductive board having a top and a bottom plurality conductive substrates sections disposed across the top of the non-conductive board; at least one conducting element disposed on each of the conductive substrate sections; a plurality of electrical contacts on the bottom the non-conductive board, wherein each of the electrical contacts on the bottom of the non-conductive board are in electrical communication with one of the conductive substrate sections on the top of non-conductive board.

A general problem arising with these various technologies relates to the difficulties of channelling voltage at the proper level to the negative or ground and positive terminals of any device to be supplied, whilst avoiding short circuits or leakage currents through conductive articles or substances that may come into contact with the charging surface. Generally, the preceding prior art methods rely to some extent on the dimensions and/or physical disposition of the charging regions of the surface, and of dielectric regions between them on one hand, and the physical disposition of charging terminals on the device to be charged on the other hand. In the case of WO2017046458 these provisions are supplemented by measuring the current drawn by respective pads.

These approaches are not entirely satisfactory since they represent constraints on the layout of the charging surface and/or the contacts of the charging terminals of the device, yet cannot rule out the inadvertent creation of short circuits. Additionally, prior art approaches tend to require complex electronics in the device itself for the device to be effectively detected and distinguished. Still further, they tend to treat all and any connected devices as equal and interchangeable, with respect to their coupling characteristics and entitlement to connect, which may lead to difficulties in terms of over-voltage supply, over current supply, overheating and the like. It is thus as a consequence desirable to provide an arrangement offering improvements in these considerations.

SUMMARY OF THE INVENTION

In accordance with the present invention in a first aspect there is provide a reporting device comprising a first supply line and a second supply line and an operational unit operable at a first potential difference across the first supply line and the second supply line when coupled to the operational unit, the reporting device further comprising a communications interface operable to send and/or receive electrical communication signals across the first supply line and the second supply line when coupled thereto at a second potential difference level, the second potential difference level being lower than the first potential difference level.

In accordance with a development of the first aspect, the operational unit is switchably coupled across the first supply line and the second supply line by the operation of an operational unit voltage modulator, the operational unit voltage modulator being configured to couple the operational unit across the first supply line and the second supply line when the potential difference across the first supply line and the second supply line exceeds a first threshold voltage, the first threshold voltage being greater than the second potential difference.

In accordance with a development of the first aspect, the first switching device comprises a MOSFET transistor, whose gate is coupled to a reference circuit coupled between the first supply line and the second supply line is, whereby the reference circuit is adapted to activate the MOSFET when a predetermined voltage between the first supply line and the second supply line is reached so as to couple the operational unit across the first supply line and the second supply line.

In accordance with a development of the first aspect, the reference circuit comprises a resistance and a first zener diode coupled between the first supply line and the second supply line, and wherein the gate of the MOSFET is coupled to the connection between the resistance and the first zener diode.

In accordance with a development of the first aspect, the communications interface unit is switchably coupled across the first supply line and the second supply line by the operation of a communications interface voltage modulator, the communications interface voltage modulator being configured to couple the communications interface unit across the first supply line and the second supply line when the potential difference across the first supply line and the second supply line is below a first threshold voltage, the first threshold voltage being lower than the first potential difference.

In accordance with a development of the first aspect, the second switching device comprises a MOSFET transistor, whose gate is coupled to a reference circuit coupled between the first supply line and the second supply line is, whereby the reference circuit is adapted to activate the MOSFET when a predetermined voltage between the first supply line and the second supply line is reached so as to couple the communications interface to the first supply line and/or the second supply line.

In accordance with a development of the first aspect, the reference circuit comprises a resistance and a second zener diode coupled between the first supply line and the second supply line, and wherein the gate of the MOSFET is coupled to the connection between the resistance and the second zener diode.

In accordance with a development of the first aspect, the reporting device further comprises an anti-voltage-inversion circuit coupling first supply line and a second supply line.

In accordance with a development of the first aspect, the reporting device further comprises a further switching device isolating the operating unit from the first supply line or the second supply line when a potential difference level greater than the first potential difference by a predetermined margin is present across the first supply line and a second supply line.

In accordance with a development of the first aspect, the communications interface is adapted to send or receive data and/or addressing information via either the first supply line or the second supply line by means of an electrical signal across the first supply line and the second supply line, the electrical signal having a maximum voltage less than or equal to the second potential difference level.

In accordance with a development of the first aspect, the reporting device further comprises an anti-reverse current circuit across the operational unit.

In accordance with a development of the first aspect, the reporting device further comprises an energy storage coupled across the first supply line and the second supply line, the energy storage configured so at to store energy from the first supply line and the second supply line, and to provide energy to the communications interface when not coupled to the communications interface.

In accordance with a development of the first aspect, the first supply line and the second supply line are coupled to respective ones of a plurality of conductive regions disposed on a surface.

In accordance with a development of the first aspect, the operational unit comprises a battery, whereby the battery is charged by the presence of a potential difference across the first supply line and the second supply line when coupled to the operational unit.

In accordance with a development of the first aspect, the electrical communication signals are analogue communications signals.

BRIEF DESCRIPTION OF THE DRAWINGS

The above and other advantages of the present invention will now be described with reference to the accompanying drawings, for illustration purposes only, in which.

DETAILED DESCRIPTION

Figure 3:
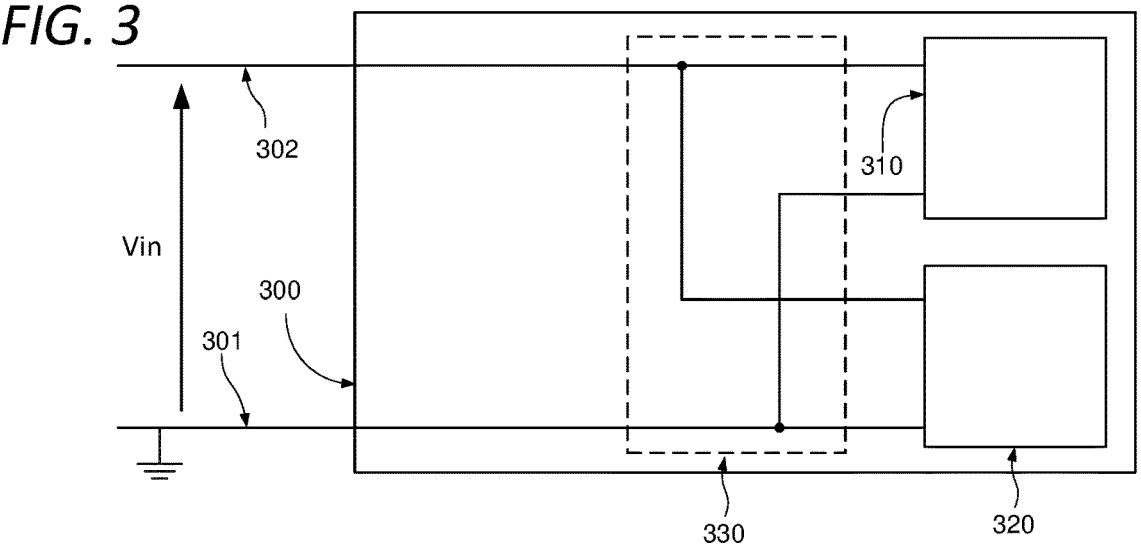
FIG. 3 shows a first embodiment.

FIG. 3 shows a first embodiment.

Figure 1:
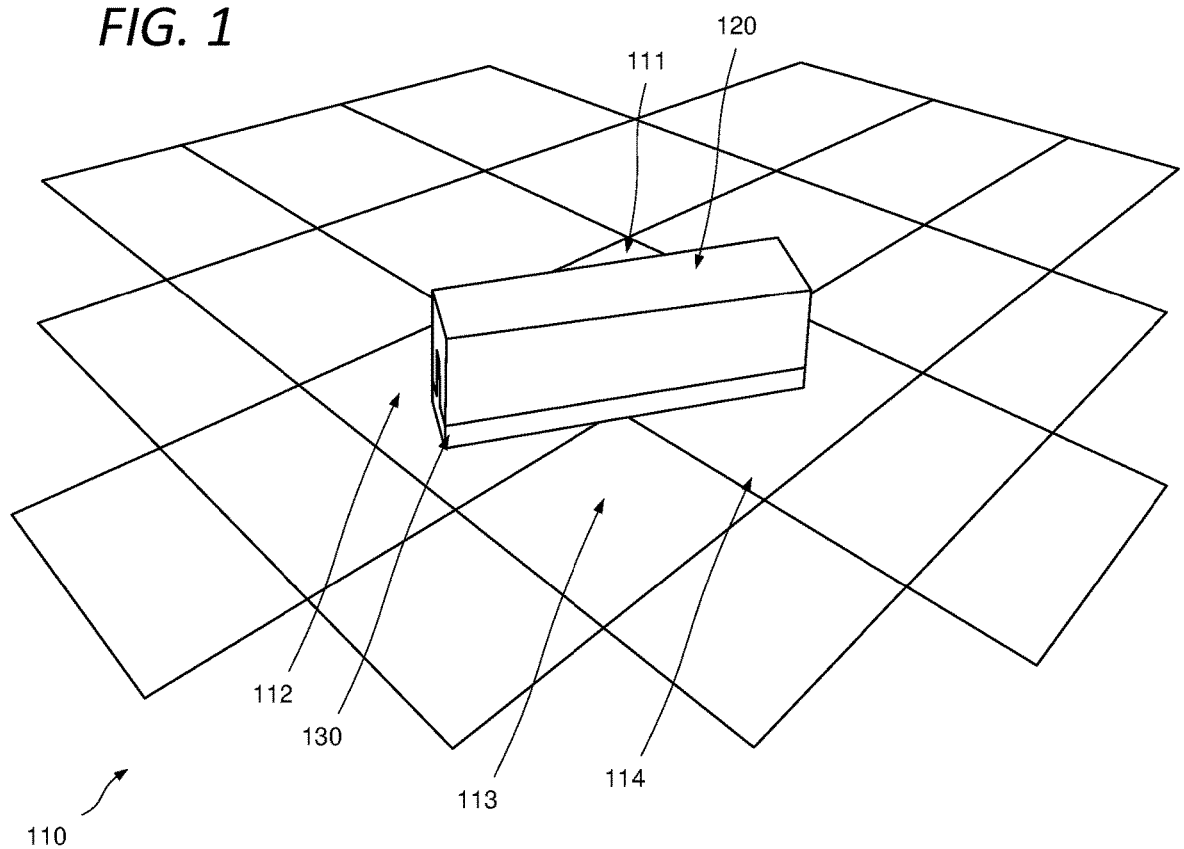
FIG. 1 presents aspects of the prior art approach provided by WO2017046458.
Figure 2:
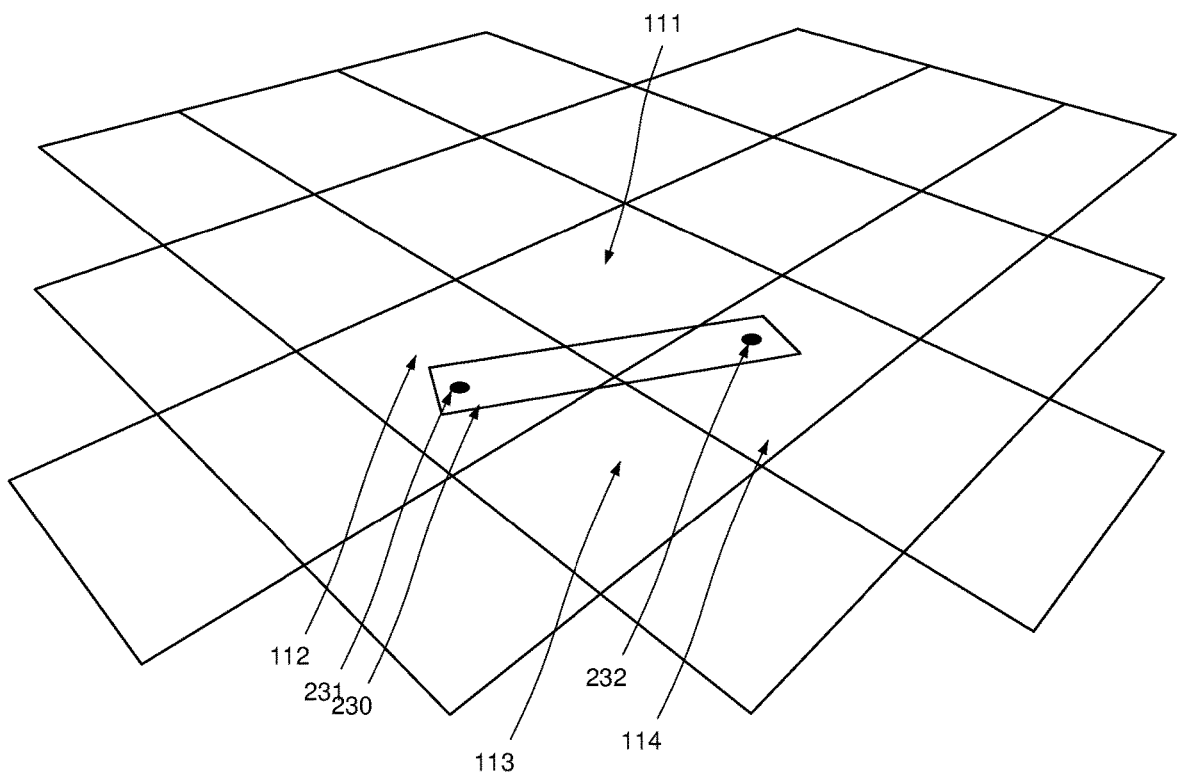
FIG. 2 presents aspects of the prior art approach provided by WO2017046458 in further detail.

As shown in FIG. 3, there is provided a reporting device 300 comprising a first supply line 301 and a second supply line 302. As shown, the first supply line is coupled to ground, and the second supply line is coupled to a positive fixed voltage with respect to the first supply line, however the skilled person will appreciate that the present invention may be adapted to any pair of supply voltages, of direct or alternating current, as desired. The embodiment of FIG. 3 further comprises an operational unit 310 operable at a first potential difference across the first supply line and the second supply line when coupled to the operational unit. This operation unit may comprise any electronic system, or group of systems, operable at a particular supply voltage, or range of supply voltages. For example, the operation unit may comprise a power cell or battery, possibly with associated charge control circuitry. The operational unit may comprise a motor, possibly with associated control circuitry. The operational unit may comprise a computing device, comprising for example one or more processors, one or more memory devices, one or more interface devices, and so on, as known to the skilled person. The operational unit may comprise any or all of these examples, and/or any of the multitude of electrical devices that will readily occur to the skilled person. It will be appreciated that some or all of these devices may require additional operating voltages besides the first potential difference, which additional operating voltages may be provided by independent conventional supply means, additional parallel circuits in accordance with the present invention, or by modification of the first potential difference as required. As shown in FIG. 1, the reporting device 300 further comprises a communications interface 320 operable to send or receive electrical communication signals across the first supply line and the second supply line when coupled thereto at a second potential difference level, the second potential difference level being lower than the first potential difference level.

By this means, the reporting device may engage in communications by means of the communications interface 320 over the first supply line 301 and second supply line 302 without the operational unit being activated.

The communication interface 320 may communicate by any convenient means. The communication interface may send and receive digital or analogue signals. Data may be encoded in these signals by means of mark-space ratio, one or more quantized voltage levels, Differential Signalling, Pulse Code Modulation (PCM), Delta Modulation, or any other convenient approach. In particular, communications may take place using standard communications such as those defined for standards such as USB, Singlewire and the like. Furthermore additional supply lines, for example at further voltage levels may be provided, which may be coupled directly to the operational unit, in which case, USB communications which are conventionally implemented across four connectors, of which two are coupled to fixed voltages (Ground and 5 v) and two others carry communications signals may implemented in embodiments, with the two connections carrying communications signals being driven by the communications interface and the remaining fixed voltage connections corresponding to the additional supply lines.

The communications interface may be adapted to send or receive data and/or addressing information via either or both of the first supply line or the second supply line by means of an electrical signal across the first supply line and the second supply line, the electrical signal having a maximum voltage less than or equal to the second potential difference level.

The electrical communication signals may be analogue communications signals. For example, the communications signals may be frequency, amplitude or phase modulated, or may be encoded as a constant voltage level as determined by a resistance value in the communications interface. The electrical communication signals may be digital communications signals.

As shown, the reporting device may optionally comprise coupling circuitry 300. Although as shown in FIG. 3 the operational unit 310 and communications interface 320 may both be permanently connected which may be adapted to the first supply line 301 and second supply line 302, in other embodiments for example as described in further detail below, either the operational unit 310 or communications interface 320 or both may be switchably coupled to the first supply line 301 or the second supply line 302 or both.

It will be appreciated that depending on implementation choices, it may be necessary to consider power supply for the communications interface 320. If the only source of power for the reporting device is the first and second supply lines, the use of these supply lines for the transmission of communications signals may complexify or even preclude the use of those same lines simultaneously for power supply purposes. Solutions exist for the simultaneous use of a pair of conductions for power supply and signalling as will occur to the skilled person, for example based on the approaches used in Power over Ethernet, Power line networking and the like. Alternatively, the reporting device may further comprise an energy storage coupled across the first supply line and the second supply line configured so at to store energy from the first supply line and the second supply line and to provide energy to the communications interface when the communications interface is performing signalling and/or receiving communications. The energy storage may comprise a capacitor, battery or the like.

Figure 4:
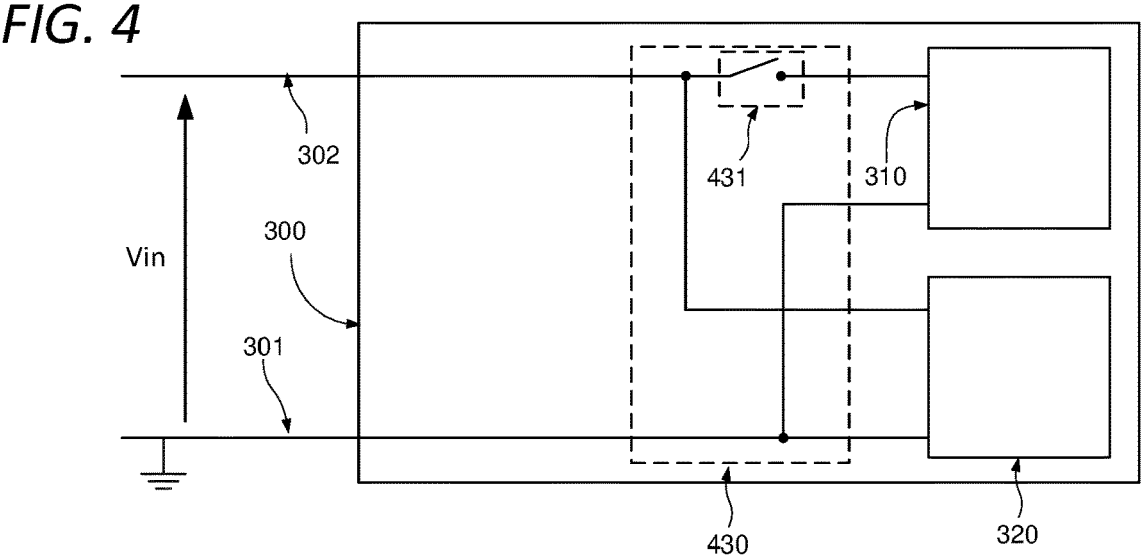
FIG. 4 shows a second embodiment.

FIG. 4 shows a second embodiment.

FIG. 4 shows an arrangement substantially similar to that of FIG. 3, however as shown the operational unit 310 is switchable coupled across the first supply line and the second supply line by the operation of an operational unit voltage modulator 431 belonging to coupling circuitry 430. The operational unit voltage modulator 431 may be configured to couple the operational unit 310 across the first supply line 301 and the second supply line 302 when the potential difference across the first supply line 301 and the second supply line 302 exceeds a first threshold voltage, the first threshold voltage being greater than the second potential difference.

By this means it can be ensured that the operational circuit is not exposed to communications signals directed to or from the communications interface 320, whose characteristics such as low voltage, or high frequency signalling may cause unexpected or undesirable behaviour in the operational circuit, or which may interfere with the communications signal.

As shown, the operational unit voltage modulator 431 comprises a first switching device closing an electrical connection between the second supply line and the operational unit when the potential difference across the first supply line and the second supply line exceeds a first threshold voltage.

Alternatively, or additionally, the operational unit voltage modulator 431 may operate to close an electrical connection between the first supply line 301 and the operational unit 310 when the potential difference across the first supply line and the second supply line exceeds a first threshold voltage.

Figure 5:
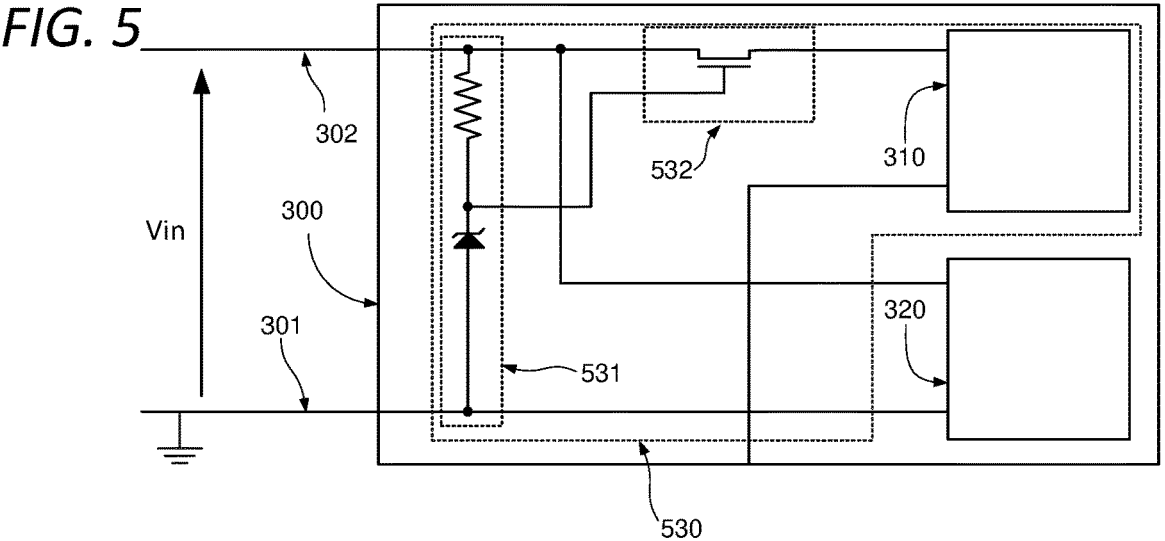
FIG. 5 shows a third embodiment.

FIG. 5 shows a third embodiment.

FIG. 5 shows an arrangement substantially similar to that of FIG. 4, however as shown the first switching device 431 of the operation unit voltage modulator 430 comprises a MOSFET transistor 532, whose gate is coupled to a reference circuit 531 coupled between the first supply line and the second supply line is, whereby the reference circuit 531 is adapted to activate the MOSFET 532 when a predetermined voltage between the first supply line 301 and the second supply line 302 is reached. The skilled person will appreciate that many other switching devices may be used as desired. For example, an electro-mechanical relay, Bipolar junction transistor, optocoupler, thyristor, Triac and so on may all be adapted for use in embodiments.

As shown, the reference circuit 531 optionally comprises a resistance and a first zener diode coupled between the first supply line and the second supply line in series, with the gate of the MOSFET 532 coupled to the connection between the resistance and the first zener diode. The skilled person will appreciate that many other reference devices may be used as desired. For example, a shunt, voltage divider circuit, op-amp circuits, and so on may all be adapted for use in embodiments.

Figure 6:
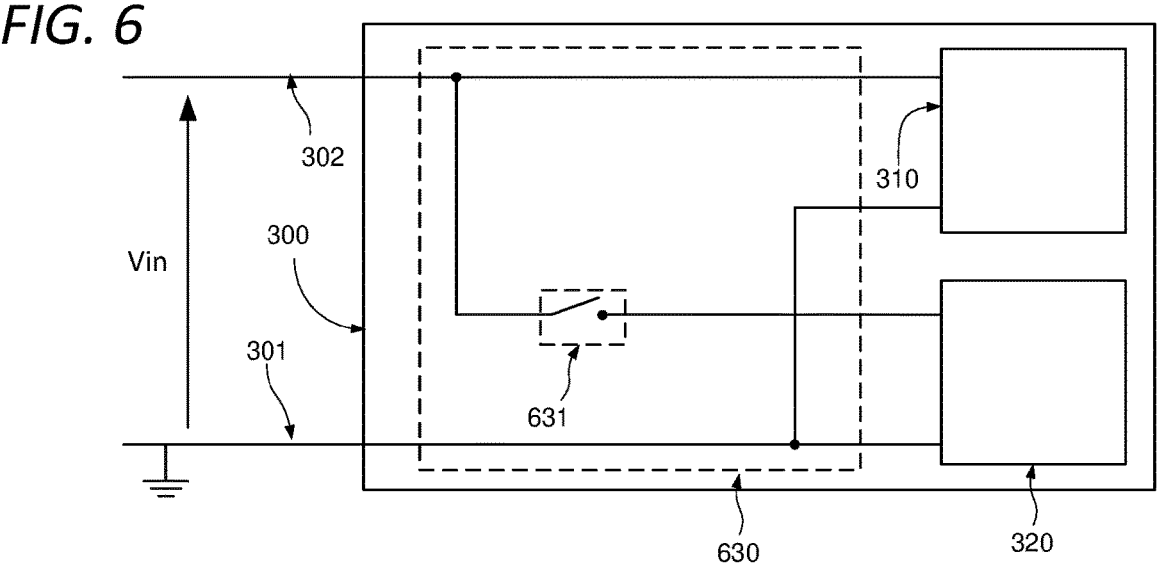
FIG. 6 shows a fourth embodiment.

FIG. 6 shows a fourth embodiment.

While FIGS. 4 and 5 present embodiments in which the operational circuit 310 is switchably coupled to the supply lines, FIG. 6 shows an arrangement substantially similar to that of FIG. 3, in which the communications interface unit 320 is switchably coupled across the first supply line and the second supply line by the operation of a communications interface voltage modulator 631, the communications interface voltage modulator 631 being configured to couple the communications interface unit across the first supply line 301 and the second supply line 302 when the potential difference across the first supply line and the second supply line is below a first threshold voltage, the first threshold voltage being lower than the first potential difference. The term "switchably" is understood to indicate that a circuit is arranged to be switchable, that is, susceptible to be switched, e.g. between two or more stable configurations.

As such, the reporting device may comprise a second switching device closing an electrical connection between the first supply line or the second supply line and the communications interface when the potential difference across the first supply line and the second supply line is below a first threshold voltage, the first threshold voltage being lower than the first potential difference.

Figure 7:
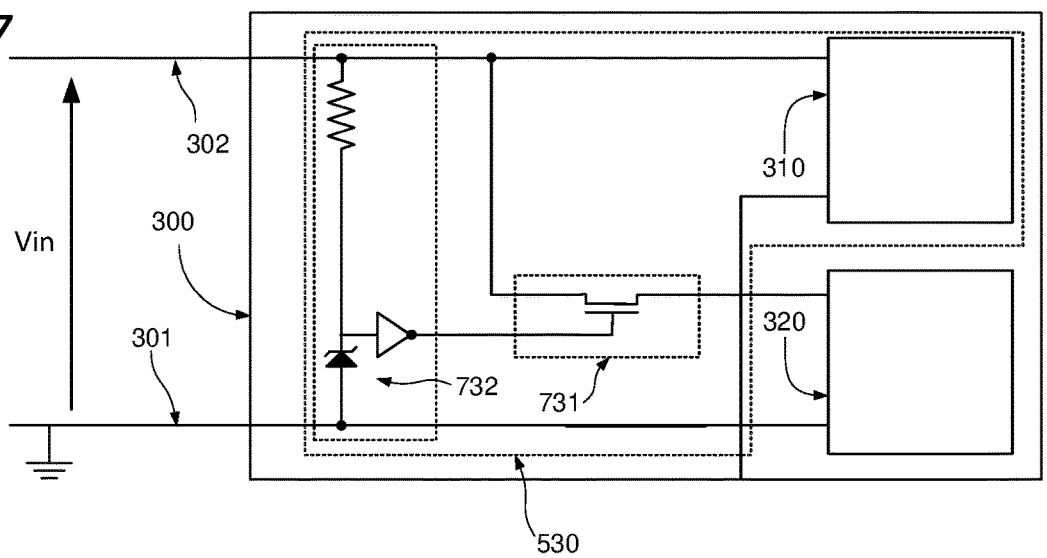
FIG. 7 shows a fifth embodiment.

FIG. 7 shows a fifth embodiment.

FIG. 7 shows an arrangement substantially similar to that of FIG. 6, however as shown the first switching device of the communications unit voltage modulator 730 comprises a MOSFET transistor 732, whose gate is coupled to a reference circuit 731 coupled between the first supply line and the second supply line is, whereby the reference circuit 731 is adapted to activate the MOSFET 732 when the voltage between the first supply line 301 and the second supply line 302 is below a predetermined threshold. The skilled person will appreciate that many other switching devices may be used as desired. For example, an electro-mechanical relay, Bipolar junction transistor, optocoupler, thyristor, Triac and so on may all be adapted for use in embodiments.

As shown, the reference circuit 531 optionally comprises a resistance and a first zener diode coupled between the first supply line and the second supply line in series, with the gate of the MOSFET 532 coupled to the connection between the resistance and the first zener diode. The skilled person will appreciate that many other reference devices may be used as desired. For example, a shunt, voltage divider circuit, op-amp circuit, and so on may all be adapted for use in embodiments.

As such, the second switching device may comprise a MOSFET transistor, whose gate is coupled to a reference circuit coupled between the first supply line and the second supply line is, whereby the reference circuit is adapted to activate the MOSFET when a predetermined voltage between the first supply line and the second supply line is reached.

The embodiments of FIGS. 4 and 5 present the switchable coupling of the operational unit 310 when the voltage across the supply lines is above a threshold, and the embodiments of FIGS. 4 and 5 present the switchable coupling of the communications unit 320 when the voltage across the supply lines is below a threshold. It will be appreciated that in further embodiments, the operational unit 310 may be switchably coupled when the voltage across the supply lines is above a threshold, and the communications unit 320 switchably coupled when the voltage across the supply lines is below a threshold, for example by combining any approach described with respect to FIG. 4 or 5 on one hand with an approach described with reference to FIG. 6 or 7 on the other. Where such a combined approach is adopted, the applicable voltage thresholds may be the same so that one device is coupled when the other is dis-coupled and vice versa. Alternatively, the threshold at which the Operating device is coupled may be below that at which the communications device is dis-coupled, so that for certain voltages both devices may be coupled. Alternatively, the threshold at which the Operating device is coupled may be above that at which the communications device is dis-coupled, so that for certain voltages neither device may be coupled.

Still further, the threshold for one or both devices may be different for rising or falling voltages, so that a hysteresis behaviour is introduced, with one device or both remaining in operation at voltages that would not have enabled an initial coupling, or vice versa.

Still further, the threshold for one or both devices may be filtered, so that a voltage exceeding a threshold for only a short period will not cause a change of coupling status. This may mean in particular that communications signals may have a peak voltage above the threshold voltage, but the operational circuit need not be coupled to the supply lines unless the average voltage exceeds the threshold, for example.

Figure 8:
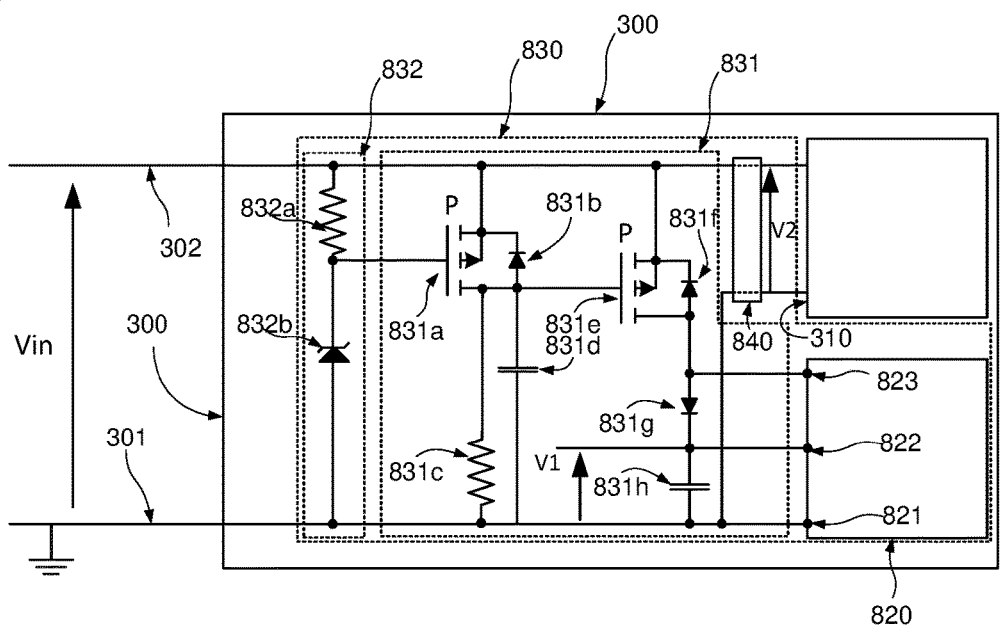
FIG. 8 shows an article incorporating a sixth embodiment.

FIG. 8 shows an article incorporating a sixth embodiment.

FIG. 8 is an example of a combined approach as mentioned above

As shown in FIG. 8, there is provided a reporting device 300. The reporting interface 300 comprises a communications interface 820 operable at a first potential difference level. By way of example, the communications interface 820 may be operable at 3.3 v. The reporting interface 300 further comprises a voltage modulator 830 coupled across a first supply line 301 and a second supply line 302. An operational circuit of the article 310 is also coupled across the first supply line 301 and a second supply line 302. The reporting device 300 may be of any of the types mentioned above, or otherwise, and the operational circuit 310 will comprise whatever components of the article may benefit from the provision of power. The operational circuit 310 will be operable at a voltage higher than the first potential difference level. In particular, the operational circuit may comprise a battery, and any accompanying charge management circuitry. The voltage modulator 830 is configured such that when a second potential difference level less than or equal to the first potential difference is present across the first supply line and a second supply line the first supply line and the second supply line are coupled to provide the second potential difference to the communications interface.

As shown, the voltage modulator 830 comprises a voltage threshold circuit 832 configured to output a voltage corresponding to the voltage across the first supply line and the second supply line up to a predetermined threshold voltage corresponding to the first potential difference level, and then remains clamped to that voltage when the voltage across the first supply line and the second supply line exceeds the predetermined threshold voltage corresponding to the first potential difference level. By way of example as shown, this may be achieved by means of a zener diode 832b in series with a resistor 832a, with the cathode of the zener diode coupled to the resistor and the anode coupled to the ground line 301, the output of the circuit 832 being taken at the junction between the zener diode 832b and the resistor. Meanwhile, the reporting device comprises a switching circuit 831, controlled by the output of the threshold circuit 832, so that a low voltage output by the threshold circuit 832, corresponding to a large potential difference between 301 and 302, closes the switch to bring the communications interface 820 into communication with the power supply line 302, and a voltage higher than the threshold voltage output by the threshold circuit 832 opens the switch to isolate the communications interface 820 from communication with the power supply line 301.

Accordingly, if communications signals have a peak voltage lower than the first potential difference, the zener diode does not pass current and the voltage modulator 831 is active, so that the communications interface is coupled to the power lines, and receives, and/or is able to emit, communications signals. When the Input voltage is higher than the Zener Voltage, the diode passes current, and the MOSFET, decoupling the communications interface from the power lines thereby stopping the communication and protecting the communications interface. By this means, the voltage modulator 831, 832 discriminates between low voltage communications signals, and higher voltages intended for power supply to the operational circuit 310. The communications interface is thus protected from potentially damaging voltages and currents on the power supply line 302 when this is being used to provide power to the operational circuit 310, but remains receptive to communications signals that may be addressed to the communications interface 820 on the same power supply line 302 insofar as these are encoded at a peak voltage below the threshold voltage. Accordingly, the coupling communications interface may be adapted to emit communications signals encoded as time variant voltages over the multimodal electrical coupling having a mean voltage below the minimum voltage expected by the operational circuit.

Units 831 and 832 should be seen as functional units, which may be implemented in a number of manners which may occur to the skilled person.

In operation, the functional unit 831 disconnects the communications interface when the potential difference between the voltages provided by the element 832 and supply line voltage 301 exceeds a certain negative threshold. The unit 832 provides a voltage making it possible to exceed this threshold potential difference when the voltage of 302 is greater than or equal to the maximum voltage allowed for the communications interface 820.

In one exemplary implementation, the function 832 may be provided by a resistance in series with a zener diode. The anode of the zener diode may be connected to supply line 301 and the cathode provides the entrance voltage of the unit 831. The resistance R1 is placed between the supply line 301 and the cathode of the zener diode. When the potential difference between ground line 301 and supply line 302 is lower than the zener voltage of the diode, the diode acts as an open circuit and the resistance brings the entrance voltage of 831 to the value of supply line 302. The voltage activating 831 is thus null. When the potential difference between lines 301 and 302 is greater than the zener voltage of the diode, the diode imposes this fixed voltage at its terminals, and the voltage activating unit 831 climbs until it reaches, and exceeds, the negative threshold, disconnecting the communications interface 820.

An alternative manner to implement the function of unit 611 may be to use a simple potential divider, with the centre point connected to the entrance of unit 831, so that the zener diode is replaced with a further resistor R2 (not shown). In this case, the voltage activating unit 832 is defined by the relationship $R1/((R1+R2)*(V_{302}-V_{301}))$. In this case, the parameters R1 and R2 will be fixed such that the negative threshold is reached when the voltage on ground line 301 reaches the maximum voltage allowed for the communications interface.

The voltage modulator may comprise a first switching device opening an electrical connection between the first supply line or the second supply line and the communications interface when the second potential difference level is greater than the first potential difference is present across the first supply line and a second supply line.

The first switching device may comprises a P-MOSFET transistor, whose gate is coupled to the connection between a resistance and a first zener diode coupled between the first supply line and the second supply line.

The general approach of the arrangement of FIG. 6 is to selectively connect the communications interface to the supply lines, whilst maintaining the operational circuit in permanent connection. It will be appreciated that similar operating principles may be adapted to selectively connect the operational circuit to the supply lines, whilst maintaining the communications interface in permanent connection. Still further, it will be appreciated that similar operating principles may be adapted to selectively connecting either the operational circuit to the supply lines or the communications interface in permanent connection the supply lines at any given instant.

In particular, as shown in FIG. 8, the switching circuit 831 comprises a first P channel MOSFET transistor 831*a* having its gate coupled to the output of the voltage threshold circuit 832, its source coupled to the positive supply line 831*b*, and its drain coupled to the ground line 831*a* via a resistance 831*c* and capacitor 831*d* arranged in parallel. The drain of first P channel MOSFET transistor 831*a* is also connected to the gate of a second P channel MOSFET transistor 831*e*. The source of the second P channel MOSFET transistor 831*e* is connected to the positive supply line 831*b*, and the drain is coupled to the ground line 831*a* via a diode 831*g* and a capacitor 831*h* in series, the anode of the diode 831*g* being coupled to the drain of second P channel MOSFET transistor 831*e*. The junction between the cathode of the diode 831*g* and the capacitor 831*h* is coupled to the input of the communications interface 820.

MOSFET 831*a* is activated when the negative threshold voltage between 831*b* and 831 output is reached.

It will drive 831*e* MOSFET's gate from 831*a* voltage (because of 831*c*) to 831*b* voltage.

This will close 831*e* MOSFET and disconnect the communications interface from the line 831*b* protecting it against overvoltage.

At lower voltage, when 831*e* is activated, current can flow from 831*b* line to the memory and charge the capacitance 831*h*.

As shown communications interface 820 comprises 3 inputs/output terminals 821, 822, 823. Terminal 821 is the ground connected directly to 301, terminal 822 is a supply line connected to 831*g* cathode and terminal 823 is a communicating pin that is connected to 831*g* anode in order to be able to sense the voltage variations for communication without dependency on the charge/discharge status of 831*h*.

Capacitance 831*d* is provided for high speed communications at 3V, in order to prevent the gate 831*f* from closing too quickly when a 0bit is sent (Vin=0V). 831*d* keeps 831*g* gate negative for a small moment so that 820 can receive the 0bit.

During communication, when bit 1 is sent, the voltage is high so the memory has power but when we send bit 0 the voltage is close to 0V so the memory has to draw power from 831*h*. At that moment 831*h* is prevented from discharging through 831*b* due to the diode 831*g*.

It will be appreciated that alternative, functionally equivalent, circuits may be envisaged by the skilled person, the arrangement of FIG. 8 being presented by way of example.

It will be appreciated that a reporting devices such as those provided in any preceding embodiment may comprise additional elements, providing additional features, represented schematically for example by element 840. For example the reporting device may comprise elements provided to protect the communications interface and/or the operational circuit from an over voltage and/or an under voltage. For example, the reporting device may comprise a second switching device opening the electrical connection between the first supply line or the second supply line and the operational circuit when a third potential difference level greater that than the first potential difference is present across the first supply line and a second supply line, so as to provide overvoltage and/or undervoltage protection of the operational unit 310, or communications interface 820.

Similarly, the reporting interface may comprise an anti-inversion circuit coupling the first supply line and a second supply line, to ensure that one line, e.g. 301 is always the ground line, and the other line, e.g. 302 is always the positive voltage line.

Figure 9A:
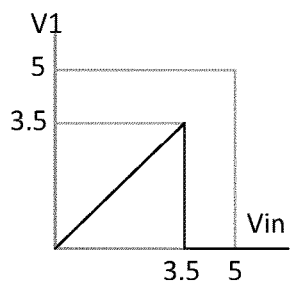
FIG. 9*a* provides a schematic representation of the relationship between an input voltage and an output voltage of a reporting interface as described with reference to FIG. 8.

FIG. 9*a* provides a schematic representation of the relationship between an input voltage and an output voltage of a reporting interface as described with reference to FIG. 8.

As shown the x axis represents the input voltage measured across the first supply line 301 and second supply line 302. The y axis represents the output voltage arriving at the communications interface, at the measured across the first supply line 301 and the point between capacitor 831*h* and diode 831*g*. As shown, the reverse breakdown voltage of the first zener diode 831*b* is set at 3.5 v—the threshold voltage of the MOSFET 831*a* by way of example, on this basis, as the input voltage rises from 0 v to 3.5 v the output voltage rises proportionally. When the input voltage passes 3.5 volts the first zener diode begins to conduct and the switching unit opens, disconnecting the memory from the input voltage, so that the output voltage falls to zero.

Figure 9B:
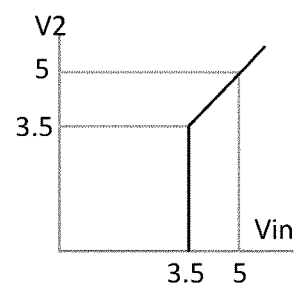
FIG. 9*b* provides a schematic representation of the relationship between an input voltage and an output voltage of a reporting interface comprising certain voltage control elements for example as described with reference to FIG. 8.

FIG. 9*b* provides a schematic representation of the relationship between an input voltage and an output voltage of a reporting interface comprising certain voltage control elements for example as described with reference to FIG. 8.

Specifically, FIG. 9*b* shows the voltage transfer characteristic in a case where the protection circuit 840 implements an under voltage protection behaviour to protect the operational circuit 310 from input voltages below that required for proper operation of the operational circuit, which by way of example is presented as 3.5 v.

This functionality might be implemented by circuitry similar to that of elements 832 and 831-832*a* may be swapped with 832*b* so the output voltage of block 832 is set left to the voltage of supply line 301 until the Zener diode starts conducting which makes 832 start rising. 832's rising output can then activate an N MOSFET (which needs positive threshold) that connects 302*a* to the operational circuit.

As shown the x axis represents the input voltage measured across the first supply line 301 and second supply line 302. The y axis represents the output voltage arriving at the operating circuit 310, at the measured across output of the voltage protection circuit 840. As the input voltage rises from 0 v to 3.55 v the output voltage remains at 0 v. When the input voltage passes 3.5 volts the protection circuit 840 begins to conduct and the output voltage begins to rise together with the input voltage.

Figure 9C:
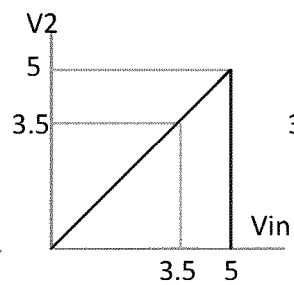
FIG. 9*c* provides a further schematic representation of the relationship between an input voltage and an output voltage of a reporting interface as described with reference to FIG. 8.

FIG. 9*c* provides a further schematic representation of the relationship between an input voltage and an output voltage of a reporting interface as described with reference to FIG. 8.

Specifically, FIG. 9*c* shows the voltage transfer characteristic in a case where the protection circuit 840 implements an over-voltage protection behaviour to protect the operational circuit 310 from input voltages above that required for proper operation of the operational circuit, which by way of example is presented as 5 v. This functionality might be implemented by circuitry similar to that of elements 831 and 832 as described above.

As shown the x axis represents the input voltage measured across the first supply line 301 and second supply line 302. The y axis represents the output voltage arriving at the operating circuit 720, as measured across output of the overvoltage protection circuit. As the input voltage rises from 0 v to 5 v the output voltage rises proportionally. When the input voltage passes 5 volts the protection circuit goes to an open circuit condition and the output voltage drops to 0 v.

By this means, it can be ensured that the operational circuit is never exposed to an excessive supply voltage.

Figure 9D:
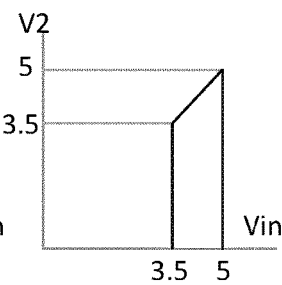
FIG. 9*d* provides a further schematic representation of the relationship between an input voltage and an output voltage of a reporting interface as described with reference to FIG. 8.

FIG. 9d provides a further schematic representation of the relationship between an input voltage and an output voltage of a reporting interface as described with reference to FIG. 8.

Specifically, FIG. 9d shows the voltage transfer characteristic in a case where the protection circuit 840 implements an under-voltage protection behaviour as described with reference to FIG. 9b together with an over-voltage protection behaviour as described above with reference to FIG. 9c, to protect the operational circuit 310 from input voltages above or below that required for proper operation of the operational circuit, which by way of example is presented as 5 v.

As shown the x axis represents the input voltage measured across the first supply line 301 and second supply line 302. The y axis represents the output voltage arriving at the operating circuit 310, at the measured across output of the overvoltage protection circuit 840. As the input voltage rises from 0 v to 3.55 v the output voltage remains at 0 v. When the input voltage passes 3.5 volts the protection circuit 840 begins to conduct and the output voltage begins to rise together with the input voltage. When the input voltage passes 5 volts the protection circuit goes to an open circuit condition and the output voltage drops to 0 v.

Accordingly, the reporting device may further comprise a switching device adapted to isolate the operating unit from the first supply line or the second supply line when a potential difference level greater than the first potential difference by a predetermined margin is present across the first supply line and a second supply line.

The reporting device may further comprise an anti-voltage-inversion circuit coupling first supply line and a second supply line, that is to say, a circuit adapted to prevent the voltage difference between the first supply line and the second supply line as seen by the operational unit and/or the communications interface as negative with regard to the ground connection of the first supply line.

The reporting device may further comprise an anti-reverse current circuit across the operational unit, that is to say, a circuit adapted to prevent current from flowing from the operational unit to whichever supply line is nominally at the higher voltage, e.g. the first supply line (being connected to ground) in the present example. In embodiments where the operational circuit comprises a battery or the like, this circuit may prevent discharge of the battery of the operational unit into the supply lines.

A reporting device in accordance with the foregoing embodiments may support communications with a multimodal electrical coupling.

Figure 10:
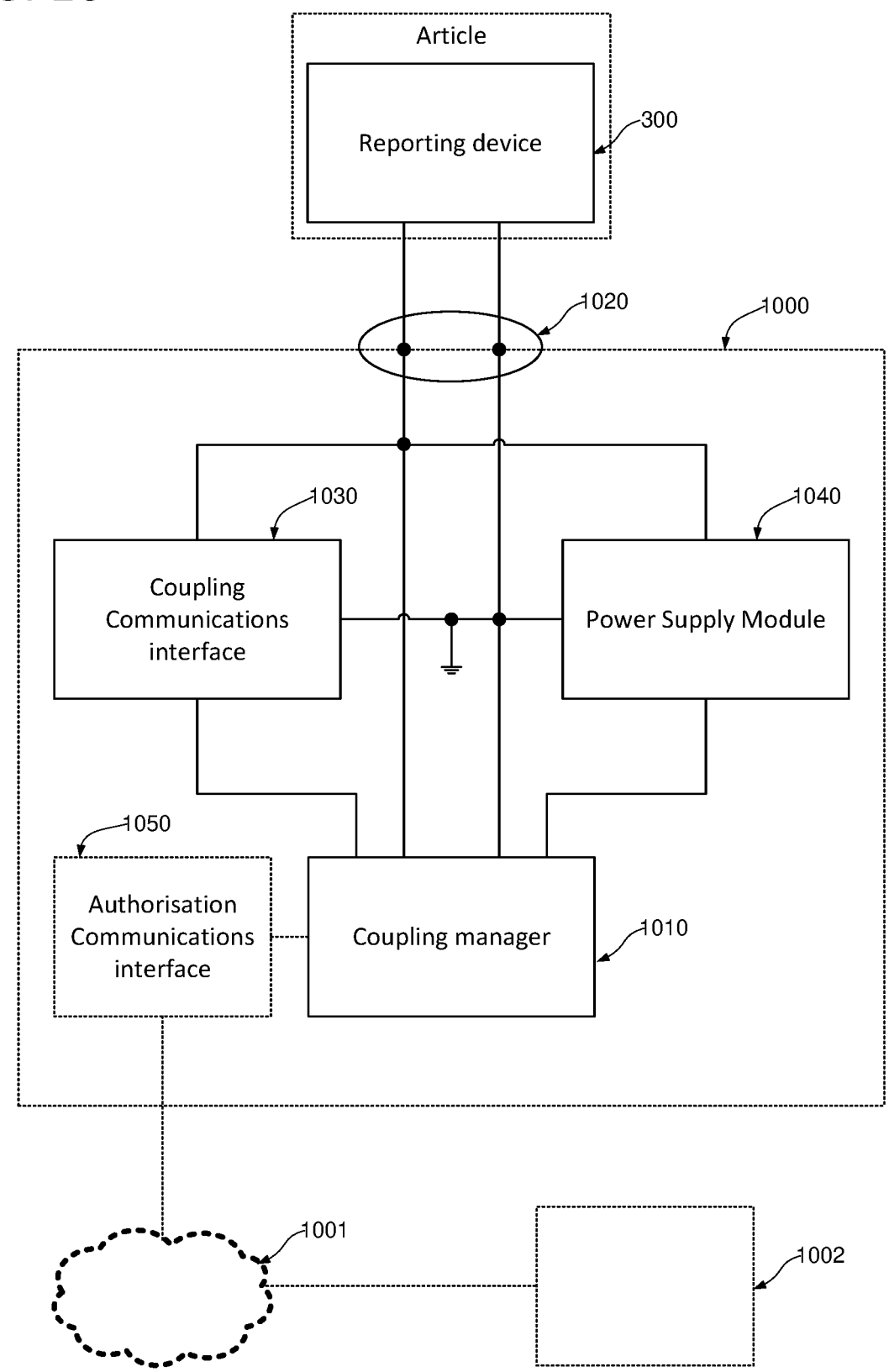
FIG. 10 shows a coupling manager for managing a multimodal electrical coupling in communication with a reporting device in accordance with an embodiment.

FIG. 10 shows a coupling manager for managing a multimodal electrical coupling in communication with a reporting device in accordance with an embodiment.

As shown in FIG. 10, there is provided a coupling manager 1000 in communication with a coupling communications interface 1030. The coupling communications interface 1030 is able to communicate with a reporting device via a multimodal electrical coupling 1020.

The coupling as shown comprises two electrical contacts. One of these may comprise a ground connection, and as such might form part of a chassis, housing, ground plane or other part of the article.

The coupling manager is also in communication with a transducer module 1040. The transducer module may be a module capable of any predetermined electrical interaction with the article. The transducer module 1040 may be a power supply module able to provide electrical power via the multimodal electrical coupling. The power supply may be able to provide one or more voltage levels. The power supply may be able to provide Alternative Current (AC), Direct Current (DC) or both. A current rating may be defined for some or each voltage level. Other power supply characteristics such as signal quality, internal resistance, AC or DC and the like may also be defined. The transducer module 1040 may be an additional communication module able to communicate with the article or some subsystem or functionality of the article, for example in accordance with a communications mode other than that used by the coupling communication interface 1030. The transducer may be an interface to a communications bus.

The coupling manager 1010 is adapted to detect the electrical connection of the reporting device 300 across the coupling 1020. The coupling manager may detect the electrical connection of the article 300 across the coupling 1020 by any convenient means. For example, the coupling manager 1010 may comprise detection circuitry able to detect a change of a capacitance and/or inductance and or resistance, and/or resistivity, or any other electrical characteristic measurable across the terminals of the coupling 1020.

The coupling manager 1010 is adapted to cause the coupling communications interface to enter into bidirectional communications with the article 300 in response to detection of the article, and in particular in response to information received from the communications interface of a reporting device associated with the article. The coupling manager may emit an enabling signal to the coupling communications interface 1030, or close a connection between the coupling communications interface 1030 and the coupling 1020, or close a connection between the coupling communications interface 1030 and a power source to bring the coupling communications interface 330 into operation, or any other convenient mechanism.

The coupling communications interface 1030 communicates with the reporting device, to interrogate it to obtain data defining the reporting device 300. The information provided by the receiving device may comprise any of a wide range of characterizing data for example as described above. Still further, the reporting device may provide details concerning additional communications capabilities, its power supply requirements, in particular a required voltage or voltage range. It may also provide an indication of peak current requirements. Still further, the details may comprise an identifier of the article itself, and/or of its owner or user.

Still further, the details may comprise the time, number and duration, and/or location (for example in terms of an identifier received from each instance of a coupling manager according to the present invention) of charging cycles in the article. The details may comprise an indicator of instantaneous or expected power requirements, including its current charge level, its current mode of operation (on, power saving, off, display on/off, screen brightness, network connection status, "airplane mode", free memory, and so on). In the case where the article is not able to receive and/or respond to the communications, such that the coupling communications interface 330 receives no meaningful response to its issued communication, the data obtained may be considered to constitute an indicator that the article is not able to receive and/or respond to the communications. As such, the communications interface of the reporting device for example as described with reference to any of the embodiments herein, may comprise or have access to a data storage device such as a memory. It may also comprise a processor, adapted to retrieve such data, and/or to compile is as required to form the transmission in the required format, and/or to transmit it during signalling for example as described herein.

The coupling manager 1010 is further adapted to determine whether the transducer module 1040 may interact with a reporting device 300 via the multimodal electrical coupling on the basis of the data defining the article. For the remainder of the description, embodiments will be described on the basis with reference to the 1o transducer module being a power supply module, and the predetermined electrical interaction being the supply of electrical power. The skilled person will appreciate that the described embodiments may all be adapted to operation with any of the other types of transducer module and corresponding predetermined electrical interaction without additional inventive thought.

In a case where the data indicates that the article is not able to receive and/or respond to the communications, the coupling manager 1010 may determine that power may not be provided to the reporting device 300 by the power module. In other cases, the coupling manager 1010 may compare the power supply requirements indicated by the apparatus with the power supply characteristics.

By way of example, a predefined set of power supply requirements might be defined, with corresponding requirements code, as illustrated below.

| Requirement code | V (V) | Imax (A) | Power Supply Module mode |
|---|---|---|---|
| 000 | 3.3 | 0.5 | 3.3 v |
| 001 | 3.3 | 1 | 3.3 v |
| 010 | 3.3 | 2 | OFF |
| 011 | 5.0 | 0.5 | 5 v |
| 100 | 5.0 | 1 | 5 v |
| 101 | 5.0 | 2 | OFF |
| 110 | 12 | 0.5 | OFF |
| 111 | 12 | 1 | OFF |

As shown, for a given Power Supply Module, a Power Supply Module mode is specified for each Requirement code. For this Power Supply Module, the available modes are "3.3 v" or "5 v", or "OFF".

In the present example, if the reporting device 300 returns Requirement code 000 or 001 or 011 or 100, the coupling manager 1010 may determine that the Power Supply Module 1040 may determine that power may be provided to the article. As such, the communications interface of the reporting device for example as described with reference to any of the embodiments herein, may have access to such a requirement code characterising the article with which it is associated, or be adapted to compile such a code and/or to transmit it during signalling for example as described herein.

In a case where it is determined that power may be provided to the article the coupling manager 1010 causes the power supply module 1040 to provide power at the multimodal electrical coupling.

The coupling manager may emit an enabling signal to the power supply module 1040, or close a connection between the power supply module 1040 and the coupling 1020, or close a connection between the power supply module 1040 and a power source to bring the power supply module 340 into operation, or any other convenient mechanism.

Optionally, the coupling manager 1010 may be further adapted in a case where it is determined that power may be provided to the article, to isolate the coupling communications interface 1030 from the multimodal electrical coupling. By this means, the coupling communications interface 1030 is protected from high voltages or currents, or transient signals that may occur during the provision of electrical power to the reporting device. By the same token, the Power Supply Module is protected from high frequency components and other potentially damaging characteristics of the communications signals.

Optionally, the coupling manager 1010 may be further adapted so that the Power Supply module is maintained in Isolation from the coupling communications interface 1030 while communications are underway between the coupling communications interface 1030 and the reporting device 300. By this means, the coupling communications interface 1030 is protected from high voltages or currents, or transient signals that may occur during the provision of electrical power to the Article.

By the same token, the Power Supply Module is protected from high frequency components and other potentially damaging characteristics of the communications signals.

Optionally, the coupling manager 1010 may be further adapted to maintain the coupling communications interface in isolation from the multimodal electrical coupling 1020 while the electrical connection of the article across the coupling is not detected. By this means, the coupling communications interface 1030 is protected from high voltages or currents, short circuits, or transient signals that may occur across the multimodal electrical coupling 1020 in the absence of an reporting device 300, for example due to conductive or electrically charged objects being brought into contact with the contacts of the multimodal electrical coupling 1020 inadvertently.

Optionally, the coupling manager 1010 may be further adapted to maintain the Power Supply Module 1040 in isolation from the multimodal electrical coupling 1020 while the electrical connection of the article across the coupling is not detected. By this means, the Power Supply Module 1040 is protected from high voltages or currents, short circuits, or transient signals that may occur across the multimodal electrical coupling 1020 in the absence of an reporting device 300, for example due to conductive or electrically charged objects being brought into contact with the contacts of the multimodal electrical coupling 1020 inadvertently. While active, the coupling communication interface and the power supply module may be automatically disconnected whenever and as soon as a short circuit condition is detected with respect to either or both terminals thereof.

As mentioned above, the data retrieved from the reporting device may include an identifier of the reporting device, or an article with which it is associated. Where this is the case, the coupling manager 1010 may be adapted to determine whether the article is authorized for power coupling with regard to the identifier. The coupling manager 1010 may further be adapted to determine that power may not be provided to the article in a case where the identifier is determined not to be so authorized. The identifier might indicate a class of product, a specific product type, or a specific individual product. It might also comprise a fingerprint of a product, as composed for example from a combination of identifiers of a number of components of a product, such that individual components might be changed without destroying the possibility of recognizing the product in question. Identifiers may include MAC addresses, IMSI codes, Processor Identifiers values and the like. It may also comprise identifiers such as product keys or license codes of software installed on the product, or a Hash or other characteristic representation of data present on the device. It may also comprise one or more identifiers of an owner, such as a name, email address, mobile telephone number, social security number, account code or the like. It may comprise a combination of any or all of these, or other such values as desired. As such, the reporting device according to any of the foregoing embodiments may further comprise means to, and/or be adapted to, store and/or retrieve and/or transmit information of any of these types. This transmitted information may be in a format that may be received and interpreted by a multimodal coupling manager and/or coupling communications interface in accordance with the present embodiment, or otherwise. Accordingly, the communications interface of any embodiment may be further adapted to store or retrieve such data, and/or to transmit it during signalling for example as described herein.

Where such identity information is available, the coupling manager 1010 may have access to a repository containing information supporting the determination of whether or not a detected article is authorized for power supply. For example, power supply may be authorized for particular classes of device, and not others, for example to discourage the coupling of reporting devices whose dimensions do not correspond to the location of the coupling interface. Power supply may be authorized for particular device types, so as to offer charging only to certain premium products for example. Power supply may be authorized for a specific Article, or Articles associated with a specific user, so as to offer charging only to users having established an account or other suitable relationship with an entity providing the coupling interface. Accordingly, the communications interface of any embodiment may be further adapted to store or retrieve such data, and/or to compile is as required to form a transmission in the required format, and/or to transmit it during signalling for example as described herein.

As such the coupling manager may have access to a repository.

The data may include a power requirements indicator of the article, and the coupling manager may be adapted to determine whether the power supply module is capable of meeting the power supply requirements of the article with regard to the power requirements indicator and with reference to power module capacity data stored in the repository, and wherein the coupling manager is adapted to determine that power may not be provided to the article in a case where it is determined that the power supply module is not capable of meeting the power supply requirements of the article. As such, the reporting device according to any of the foregoing embodiments may further comprise means to, and/or be adapted to, store and/or retrieve and/or transmit information of any of these types. This transmitted information may be in a format that may be received and interpreted by a multimodal coupling manager and/or coupling communications interface in accordance with the present embodiment, or otherwise. Accordingly, the communications interface of any embodiment may be further adapted to store or retrieve such data, and/or to compile is as required to form a transmission in the required format, and/or to transmit it during signalling for example as described herein.

The data may comprise an authorization token. Such a token may represent a right associated with an article or user to receive a charge, or a specified amount of energy, the right being expended by provision, by the coupling manager, of the specified charge or amount of power. Such a token may be protected cryptographically to prevent illicit creation of such tokens. The token may be cryptographically associated with the identity of the article or user, so that it is valid only for use by that article or user. The coupling manager may be configured to decode such tokens, and where they are found to be valid, to cause the Power Supply Module to provide power to the article as described above, to the limit of the specified amount. The Coupling manager may also be configured to submit tokens to an external authorization server as discussed further below for decoding and/or authorization with regard to centralized information. Whether or not tokens are submitted to an external authorization server for authorization, the coupling manager may report the redemption of the token to an external authorization server to prevent use of the same token with a different coupling manager. Tokens may be defined in a blockchain type structure. As such, the reporting device according to any of the foregoing embodiments may further comprise means to, and/or be adapted to, store and/or retrieve and/or transmit information of any of these types. This transmitted information may be in a format that may be received and interpreted by a multimodal coupling manager and/or coupling communications interface in accordance with the present embodiment, or otherwise. Accordingly, the communications interface of any embodiment may be further adapted to store or retrieve such data, and/or to compile is as required to form a transmission in the required format, and/or to transmit it during signalling for example as described herein.

It will also be appreciated that the identity considerations may also be combined with the power requirement considerations presented above. For example, the coupling manager 1010 might enable power supply to any device whose requirements it could meet, but provide a higher current (and thereby faster charging) to devices whose identity corresponded to an entitlement to preferential treatment.

In certain embodiments, the coupling manager may be adapted to record information. In particular, it may be adapted to record some or all of the data obtained from any reporting device 300 by means of the Coupling Communications Interface, whether or not an article was authorizes for power supply, what Power Supply Module settings were applied, and the time and/or duration of power supply.

The system of FIG. 10 may optionally further comprise an authorizations communications interface 1050 in communication with an authorization resource 1002, via communications network 1001. As mentioned above, the data retrieved from the reporting device may include an identifier of the reporting device or associated article. Where this is the case, the coupling manager 1010 may be adapted in accordance with this second embodiment to communicate with the resource 1002 via the Authorization Communications Interface 1050 to determine whether the article is authorized for power coupling with regard to the identifier. The Resource 1002 may comprise a memory or database, comprising criteria permitting the determination of whether a particular Article or reporting device may be authorized for power supply or not. For example, the resource may comprise a list of all classes of product, product types, specific products or other identifiers for which power supply may be authorized. It will be appreciated that many coupling managers, each managing a respective coupling, may communicate with a single resource, such that a particular device will be subject to the same authorization criteria for power supply from any coupling.

As such the coupling manager may further comprise an authorization communications interface, and the coupling manager may further be adapted to submit the identifier to an authorization resource via the authorization communications interface, and to receive an indication from the authorization communications interface whether power may be provided to the article, and the coupling manager may be adapted to determine that power may not be provided to the article in a case where the identifier is indicated not to be so authorized.

While the coupling interface of FIG. 10 is shown as comprising two simple electrodes, in certain embodiments a coupling interface having any number of conductive regions may be provided, for example as discussed with reference to FIG. 4.

Figure 11:
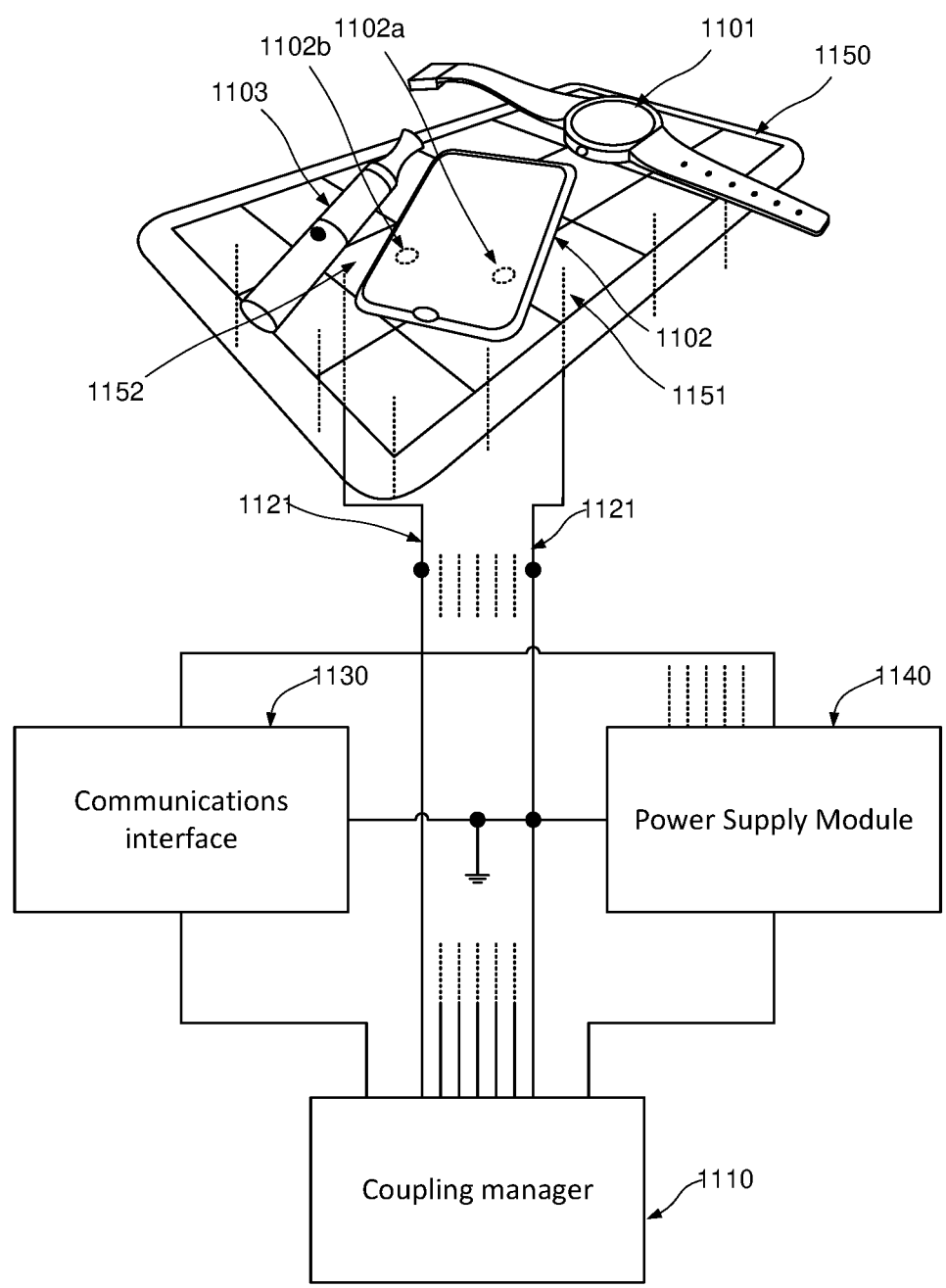
FIG. 11 shows a coupling manager for managing a multimodal electrical coupling in communication with one or more reporting devices in accordance with an embodiment.

FIG. 11 shows a coupling manager for managing a multimodal electrical coupling in is communication with one or more reporting devices in accordance with an embodiment.

As shown in FIG. 11, a surface 1150 comprises a plurality of conductive regions 1151, 1152 etc. A plurality of articles including an e-cigarette 1103, smart phone 1102 and smart watch 1101 each comprising a reporting device in accordance with an embodiment, for example as described above, are illustrated disposed on the surface 1150. Communications attributed to the respective articles in the following discussion will be understood in each case to be implemented by the operation of each article's reporting device respectively, and in particular the communications interface of each reporting device, as described above. Similarly, the respective operational action of each article, for example the charging of its battery, will be understood to be implemented as the operational unit of each reporting device as described above. It will be appreciated that any article requiring electrical power may be envisaged in this context, including any IOT device, portable backup batteries, tablet computers, laptop computers, electric vehicles, surgical or medical equipment, power tools, etc. It will be appreciated that the present invention may be applied equally to any device able to benefit from a physical data or power connection. In particular, it is not limited in scale to small devices such as those shown, but may be extended to vehicles, rack mounted computer or communications equipment, medical devices, etc.

As shown, three articles 1101, 1102 and 1103 are disposed on the surface 1150. The surface 1100 comprises a matrix of conductive regions 1121, 1122 etc. Each of these conductive regions is coupled to the coupling manager, the communications interface and the power supply module, so that each possible pair of conductive regions may constitute an instance of a multimodal electrical coupling in accordance with the present invention. As shown, articles 1102 and 1103 are devices susceptible to electrical connection. Article 1102 has a negative power terminal 1102a and a positive power terminal 1102b by way of example. As discussed above, power requirements may vary from one device to the next. For example, Article 1102 may require a 3.3V supply, whilst article 1103 may require a 5V supply, and as discussed above, the reporting device associate with each article may be configured to report these requirements accordingly. In accordance with the embodiment the coupling manager 1110 is able to detect the presence of each article coupled across any pair of conductive regions and to enter into communication with the reporting device of each article, determine whether power supply may be authorised, and in a case where power supply may be authorised, instigate power supply, substantially as described above. This might be achieved by cyclically measuring an electrical characteristic as mentioned above across each possible pair of conductive regions, simultaneously or sequentially measuring an electrical characteristic of each conductive region with regard to a reference point such as a ground terminal, a selected conductive region, emitting a communications signal apt to solicit a response from a communications interface of a reporting device for example as described above, or otherwise, or other any convenient mechanism. It will be appreciated on this basis that the Power Supply 1140 may be able to provide power to a plurality of regions independently. Furthermore, Power Supply 1140 may be able to provide different voltages, or power having other characteristics, independently to a plurality of regions, such that each article receives power meeting its individual requirements and/or consistent with its authorisation. The power supply module, coupling communications interface and coupling manager may each comprise multiplexers enabling selective connection to respective conductive regions, for example under control of the coupling manager, so that appropriate connections may be made to appropriate regions at the appropriate time, in line with the articles determined to be present, their power requirements and authentication status, and their position on the surface 1150. Equivalently, a central switching unit (not shown) might manage, for example under the control of the coupling manager, all connections between the power supply Module, The coupling communications interface and the coupling manager on one hand, and the conductive regions on the other. In the present example as shown, once the coupling manager 1110 determines the presence of the article 1102, whose terminals 1102a and 1102b are coupled across the conductive regions 1151 and 1152 respectively, the coupling manager 1110 enables the communications Interface 1130 to communicate with the article 1102. The article 1102 reports its power requirement, for example 5v. The coupling communications interface provides this information to the coupling manager which then enables to power supply module 1140 to provide 5 v to conductive region 1102b, region 1102a being coupled to ground. In this way, power is provided to the article 1102 in accordance with its requirements. Conductive regions which are not required for power supply to an authorised article may be electrically isolated of coupled to ground as appropriate.

Accordingly, the first supply line and second supply line of each reporting device are coupled to respective ones of a plurality of conductive regions disposed on a surface.

Figure 12:
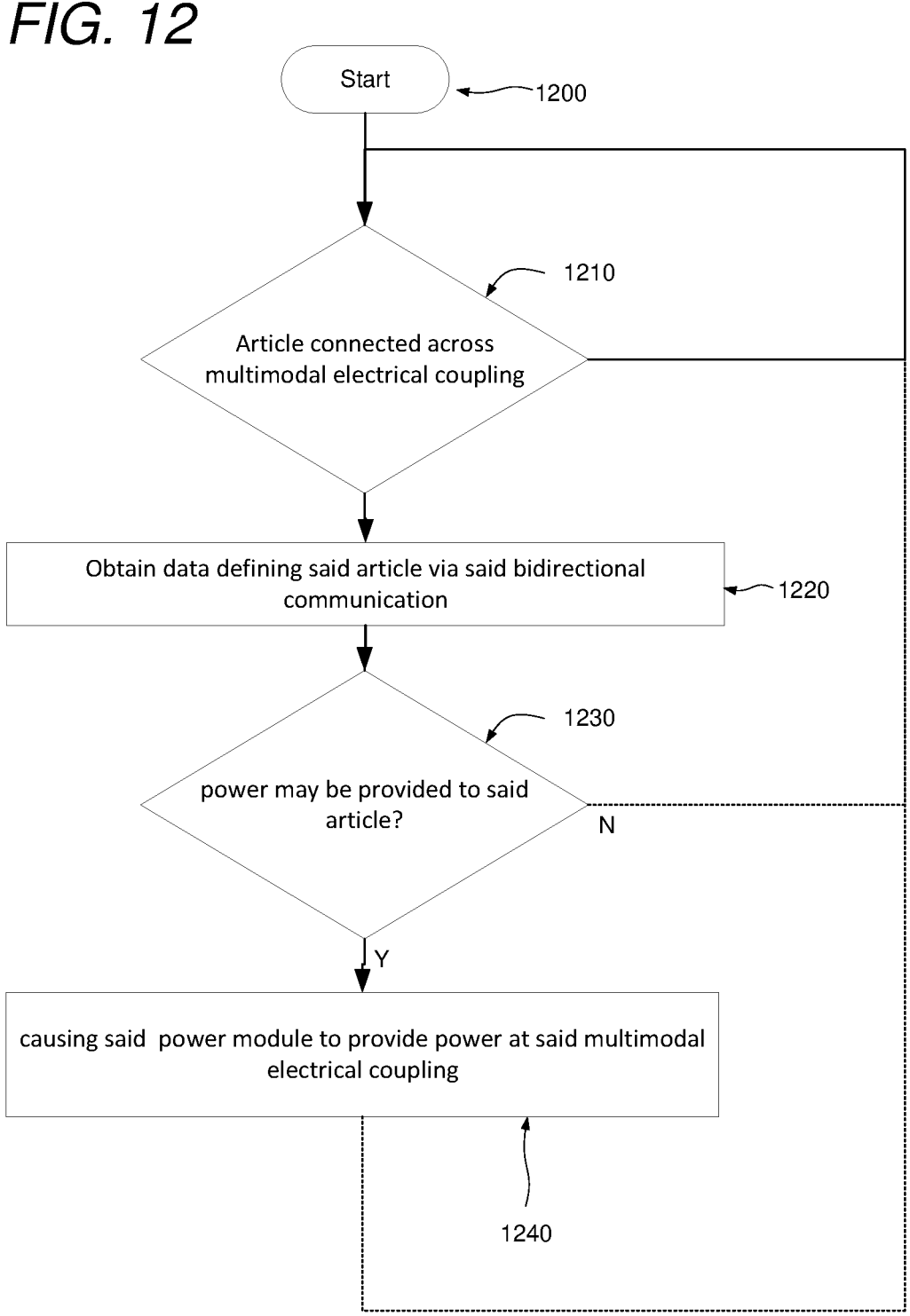
FIG. 12 presents a method of managing a multimodal electrical coupling as described with regard to FIGS. 3 to 8.

FIG. 12 presents a method of managing a multimodal electrical coupling as described above. As shown, the method starts at step 1200 before proceeding to step 1210 at which it is determined whether the electrical connection of a reporting device as described above across a multimodal electrical coupling is detected. In a case where no electrical connection of a reporting device as described above across the multimodal electrical coupling is detected, the method loops back to 1210. When an electrical connection of a reporting device as described above across a multimodal electrical coupling is detected, the method proceeds to step 1220, at which bidirectional communications with the reporting device as described above are entered into by a coupling communications interface over the multimodal electrical coupling and data defining the detected reporting device obtained via the bidirectional communication. The method next proceeds to step 1230 at which it is determined whether power may be provided to the detected reporting device by a power module via the multimodal electrical coupling on the basis of the data defining the detected reporting device. If it is determined at step 1230 power may be provided to the detected reporting device the method proceeds to step 1240 of causing the power module to provide power to the multimodal electrical coupling. As shown, after step 1240 the method loops back to step 1210. In certain embodiments, the method may loop back to step 1210 after a predetermined period. In certain embodiments, the method may loop back to step 1210 via an additional set of steps waiting for the detected reporting device connected across the multimodal electrical coupling to be removed. If it is determined at step 1230 power may not be provided to the article the method loops back to step 1210. In certain embodiments, the method may loop back to step 1210 after a predetermined period.

Figure 13:
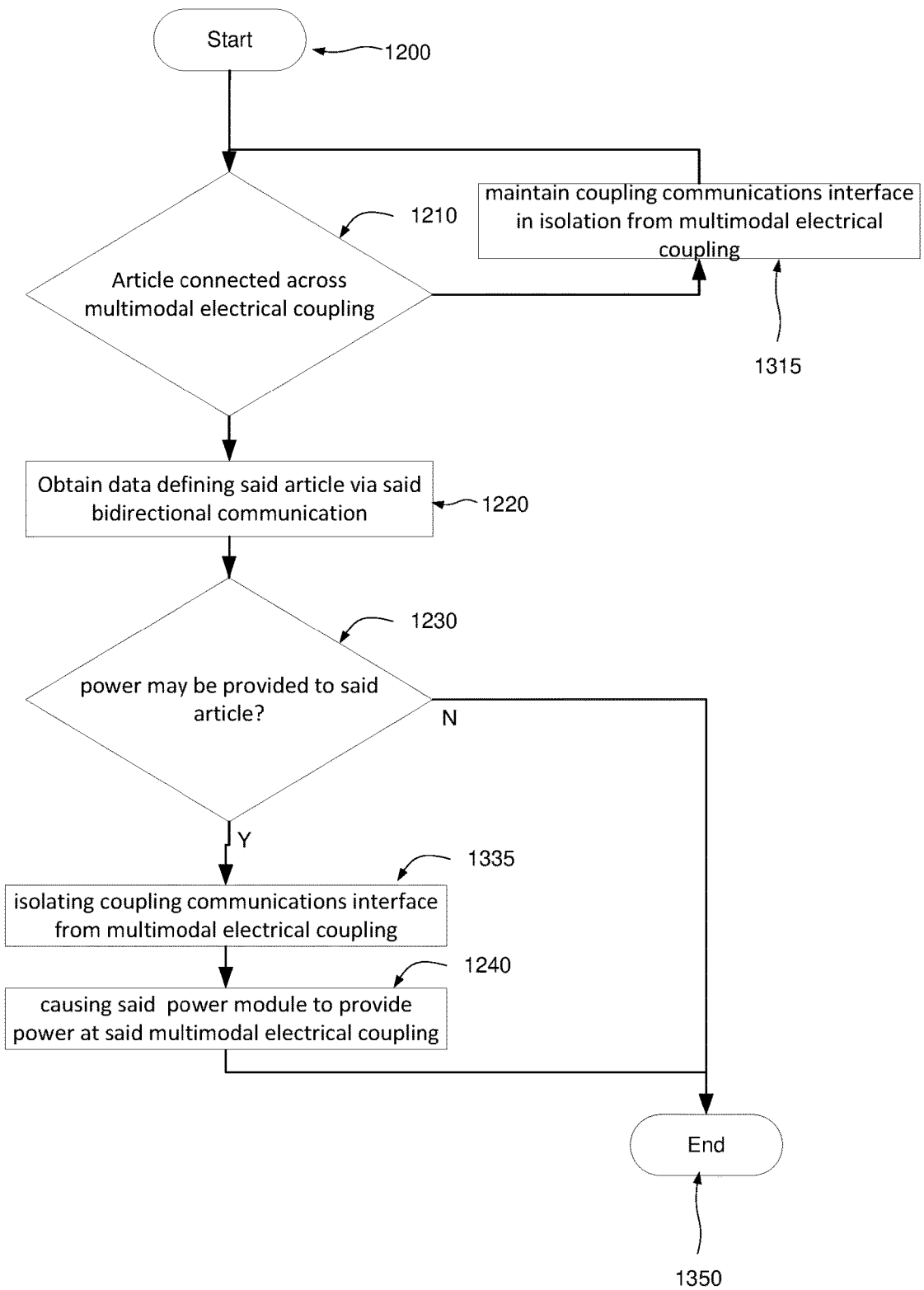
FIG. 13 presents a method of managing a multimodal electrical coupling as described with regard to FIGS. 3 to 8.

FIG. 13 presents a method of managing a multimodal electrical coupling as described above.

The method of FIG. 13 comprises the steps 1200, 1210, 1220, 1230, 1240 as described with regard to FIG. 12. Furthermore, there is provided an additional step 1315 of maintaining the coupling communications interface in isolation from the multimodal coupling in a case where no reporting device is detected at step 1210.

It will be appreciated that maintaining a functional unit in isolation may be achieved by means of an interface circuit of the functional unit itself. For example, a functional unit may be provided with one or more GPIO (General Purpose Input/Output), whose function may be programmatically controlled so that input and/or output is not enabled when the unit is to be isolated.

Additionally, there is provided an additional step 1335 of isolating the coupling communications interface in isolation from the multimodal coupling in a case where it is determined at step 1230 that power may be provided to the reporting device, before proceeding to step 1240.

It will be appreciated that various permutations of the various possibilities of isolating certain elements at certain stages of the process may be envisaged. In particular, at start block 1200 and end block 1250 the coupling communications interface and power supply module may be isolated. The power supply module may be maintained in isolation as well as the coupling communications interface in the case where no reporting device is detected at step 1210.

The skilled person will recognise that the method of FIGS. 12 and 13 are susceptible to various optional adaptations. For example, any of the steps of FIG. 13 may be incorporated independently to the method of FIG. 12. The methods may comprise an additional step of detecting removal of the reporting device after power has been provided to it.

In certain variants, there may be provided an additional step of in a case where it is determined that power may be provided to the reporting device, of isolating the coupling communications interface from the multimodal electrical coupling.

In certain variants, there may be provided an additional step of isolating the Power Supply Module from the multimodal electrical coupling while the Coupling communications interface is in operation.

In certain variants, there may be provided an additional step of maintaining the coupling communications interface in isolation from the multimodal electrical coupling while the electrical connection of the article across the coupling is not detected. In certain variants, there may be provided an additional step of maintaining the power supply module in isolation from the multimodal electrical coupling while the electrical connection of the article across the coupling is not detected, and while the communication has not determined whether power may be provided.

In certain variants, wherein the data includes an identifier of the article, there may be provided an additional step of determining whether the article is authorized for power coupling with regard to the identifier, and determine that power may not be provided to the article in a case where the identifier is determined not to be so authorized.

In certain variants, wherein the data includes a power requirements indicator of the reporting device, there may be provided an additional step of determining whether the power supply module is capable of meeting the power supply requirements of the article with regard to the power requirements indicator and with reference to power module capacity, wherein it is determined that power may not be provided to the article in a case where it is determined that the power supply module is not capable of meeting the power supply requirements of the article.

The disclosed methods can take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

These methods and processes may be implemented by means of computer-application programs or services, an application-programming interface (API), a library, and/or other computer-program product, or any combination of such entities.

As such, there is provided a program for a computer comprising instructions adapted to implement the steps described with respect to FIG. 12 or 13.

In certain embodiments, a multimodal electrical coupling, which may be comprised of any pair of conductive regions in a surface, is selectively coupled to a coupling communications interface in response to the detection of an article connected across the terminals of the coupling. The coupling communications interface may obtain data characterising the article, and determine whether this information is consistent with the supply of power to the article, in particular in terms of the power requirements of the article, and/or the identity, and corresponding authorisation status of the article. Where supply of power is determined to be allowable, a Power Supply module may be brought into connection with the multimodal electrical coupling, at which time the coupling communications interface may be decoupled. A corresponding reporting interface for integration in articles is also presented.

Accordingly there is provided a reporting device for association with an article having power requirements, where the reporting device is capable of performing communications operations, for example to specify the article's power requirements, and power supply using a single pair of conductors. Communications are performed at a lower voltage than the voltage intended for power supply operations. Optionally the communications interface of the reporting device may be disconnected at higher voltages, and the operational circuits of the reporting device may be disconnected at lower voltages, and circuits preventing inversion of voltages across the conductors, or reverse currents when the operational circuits are connected to the conductors may be provided. The reporting device may be used in connection with charging surfaces providing a matrix of conductive surfaces, and supports operation with a corresponding coupling manager.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A reporting device comprising:
a first supply line and a second supply line configured to provide power to an operational unit, and the operational unit being configured to operate at a first potential difference level across said first supply line and said second supply line when coupled to said operational unit, said reporting device further comprising:
a communications interface unit coupled to said first supply line and said second supply line and the communications interface unit configured to send or receive electrical communication signals across said first supply line and said second supply line when coupled to said first supply line and said second supply line at a second potential difference level, said second potential difference level being lower than said first potential difference level, wherein
said reporting device further comprises an operational unit voltage modulator, and wherein said operational unit is configured to be switchably coupled across said first supply line and said second supply line by an operation of said operational unit voltage modulator, said operational unit voltage modulator being configured to couple said operational unit across said first supply line and said second supply line when a potential difference across said first supply line and said second supply line exceeds a first threshold voltage, said first threshold voltage being greater than said second potential difference level, or
said reporting device further comprises a communications interface voltage modulator, and wherein said communications interface unit is configured to be switchably coupled across said first supply line and said second supply line by the operation of said communications interface voltage modulator, said communications interface voltage modulator being configured to couple said communications interface unit across said first supply line and said second supply line when the potential difference across said first supply line and said second supply line is below a first threshold voltage, said first threshold voltage being lower than said first potential difference level, and
wherein said reporting device further comprises a capacitor coupled across said first supply line and said second supply line, said capacitor configured to store energy from said first supply line and said second supply line, and said capacitor is configured to provide energy to said communications interface unit when the communications interface unit is performing signaling and/or receiving communications.

2. The reporting device of claim 1, wherein said device comprises a first MOSFET transistor, whose gate is coupled to a reference circuit coupled between said first supply line and said second supply line is, whereby said reference circuit is adapted to activate said first MOSFET transistor when a predetermined voltage between said first supply line and said second supply line is reached so as to couple said operational unit across said first supply line and said second supply line.

3. The reporting device of claim 1, further comprising an anti-voltage-inversion circuit coupling first supply line and a second supply line.

4. The reporting device of claim 1, comprising a further switching device isolating said operating unit from said first supply line or said second supply line when a potential difference level greater than said first potential difference level by a predetermined margin is present across said first supply line and a second supply line.

5. The reporting device of claim 1, wherein said communications interface unit is adapted to send or receive data and/or addressing information via either said first supply line or said second supply line by means of an electrical signal across said first supply line and said second supply line, said electrical signal having a maximum voltage less than or equal to said second potential difference level.

6. The reporting device of claim 1, further comprising an anti-reverse current circuit across said operational unit.

7. The reporting device of claim 1, wherein said first supply line and said second supply line are coupled to respective ones of a plurality of conductive regions disposed on a surface.

8. The reporting device of claim 1, wherein said operational unit comprises a battery, whereby said battery is charged by a presence of a potential difference across said first supply line and said second supply line when coupled to said operational unit.

9. The reporting device of claim 1, wherein said electrical communication signals are analogue communications signals.

10. The reporting device of claim 2, wherein said reference circuit comprises a resistance and a first Zener diode coupled between said first supply line and said second supply line, and wherein the gate of said first MOSFET transistor is coupled to a connection between said resistance and said first Zener diode.

11. The reporting device of claim 10, wherein said device comprises a second MOSFET transistor, whose gate is coupled to a reference circuit coupled between said first supply line and said second supply line is, whereby said reference circuit is adapted to deactivate said second MOSFET transistor when a predetermined voltage between said first supply line and said second supply line is reached so as to decouple said communications interface unit to said first supply line and/or said second supply line.

12. The reporting device of claim 11, wherein said reference circuit comprises a resistance and a second Zener diode coupled between said first supply line and said second supply line, and wherein the gate of said second MOSFET transistor is coupled to the connection between said resistance and said second Zener diode.

\* \* \* \* \*